United States Patent
Wang et al.

(10) Patent No.: US 11,573,576 B2
(45) Date of Patent: Feb. 7, 2023

(54) METHOD FOR CONTROLLING A DRONE, DRONE AND SYSTEM

(71) Applicant: GOERTEK INC., Weifang (CN)

(72) Inventors: Xueqiang Wang, Weifang (CN); Mengmeng Wang, Weifang (CN); Lu Bai, Weifang (CN); Xiangdong Zhang, Weifang (CN)

(73) Assignee: GOERTEK INC., Weifang (CN)

(*) Notice: Subject to any disclaimer, the term of this patent is extended or adjusted under 35 U.S.C. 154(b) by 343 days.

(21) Appl. No.: 16/633,315

(22) PCT Filed: Aug. 14, 2019

(86) PCT No.: PCT/CN2019/100505
§ 371 (c)(1),
(2) Date: Jan. 23, 2020

(87) PCT Pub. No.: WO2020/181719
PCT Pub. Date: Sep. 17, 2020

(65) Prior Publication Data
US 2021/0041896 A1   Feb. 11, 2021

(30) Foreign Application Priority Data
Mar. 13, 2019 (CN) .......................... 201910188474.6

(51) Int. Cl.
*G05D 1/10* (2006.01)
*B64C 39/02* (2006.01)
*G05D 1/06* (2006.01)

(52) U.S. Cl.
CPC ........... *G05D 1/101* (2013.01); *B64C 39/024* (2013.01); *G05D 1/0684* (2013.01);
(Continued)

(58) Field of Classification Search
None
See application file for complete search history.

(56) References Cited

U.S. PATENT DOCUMENTS 9,056,676 B1 * 6/2015 Wang ...................... B64F 1/007
9,454,154 B1   9/2016 Safarik
(Continued)

FOREIGN PATENT DOCUMENTS

CN   102298389 A   12/2011
CN   105021184 A   11/2015
(Continued)

OTHER PUBLICATIONS

And E. Olson, "AprilTag: A robust and flexible visual fiducial system," 2011 IEEE International Conference on Robotics and Automation, 2011, pp. 3400-3407, doi: 10.1109/ICRA.2011.5979561 (Year: 2011).*

(Continued)

*Primary Examiner* — Jelani A Smith
*Assistant Examiner* — Jacob Daniel Underbakke
(74) *Attorney, Agent, or Firm* — Moser Taboada (57) ABSTRACT

The present disclosure provides a method for controlling a drone, a drone, and a system. The method for controlling a drone comprises: determining operating parameters of a moving platform according to field-of-view images containing the moving platform collected at any two different moments and flight parameters of the drone; calculating a time-varying tracking position of the moving platform based on the operating parameters; controlling the drone to track the moving platform according to the time-varying tracking position of the moving platform; and controlling the drone to perform a landing operation according to a relative position of the moving platform and the drone during tracking. The technical solutions according to the present disclosure have high landing accuracy, rely less on device performance and have high versatility.

15 Claims, 2 Drawing Sheets

(52) U.S. Cl.
CPC .. *B64C 2201/027* (2013.01); *B64C 2201/123* (2013.01); *B64C 2201/127* (2013.01); *B64C 2201/145* (2013.01)

(56) References Cited

U.S. PATENT DOCUMENTS

| | | | |
|---|---|---|---|
| 2006/0152584 A1* | 7/2006 | Wang | G06T 7/33 348/143 |
| 2010/0228408 A1 | 9/2010 | Ford et al. | |
| 2017/0038778 A1 | 2/2017 | Wang | |
| 2017/0045894 A1* | 2/2017 | Canoy | G06V 20/13 |
| 2017/0308100 A1* | 10/2017 | Iskrev | G05D 1/10 |
| 2018/0364740 A1* | 12/2018 | Collins | G06V 20/176 |
| 2019/0039750 A1* | 2/2019 | Peng | B64D 37/005 |
| 2019/0094850 A1 | 3/2019 | Li et al. | |

FOREIGN PATENT DOCUMENTS

| | | | | | |
|---|---|---|---|---|---|
| CN | 106225787 | A | * | 12/2016 | ............ G01C 21/20 |
| CN | 106527481 | A | | 3/2017 | |
| CN | 107209521 | A | | 9/2017 | |
| CN | 107240063 | A | * | 10/2017 | ........... G06T 3/0075 |
| CN | 107943073 | A | | 4/2018 | |
| CN | 107943077 | A | | 4/2018 | |
| CN | 207408598 | U | | 5/2018 | |
| CN | 108459618 | A | * | 8/2018 | |
| CN | 108657455 | A | * | 10/2018 | .............. B60L 53/00 |
| CN | 108873917 | A | * | 11/2018 | |
| CN | 108873930 | A | * | 11/2018 | ............. G05D 1/101 |
| CN | 109416535 | A | | 3/2019 | |
| CN | 109947128 | A | | 6/2019 | |
| JP | 2018190362 | A | | 11/2018 | |
| WO | WO-2018015959 | A1 | * | 1/2018 | ........... B64C 39/024 |

OTHER PUBLICATIONS

M. S. Ruiz, A. M. P. Vargas and V. R. Cano, "Detection and tracking of a landing platform for aerial robotics applications," 2018 IEEE 2nd Colombian Conference on Robotics and Automation (CCRA), 2018, pp. 1-6, doi: 10.1109/CCRA.2018.8588112. (Year: 2018).*
Nguyen PH, Arsalan M, Koo JH, Naqvi RA, Truong NQ, Park KR. LightDenseYOLO: A Fast and Accurate Marker Tracker for Autonomous UAV Landing by Visible Light Camera Sensor on Drone. Sensors (Basel). May 24, 2018;18(6):1703. doi: 10.3390/s18061703. PMID: 29795038; PMCID: PMC6022018. (Year: 2018).*
Chinese Search Report for Application PCT/CN2019/100505 dated Nov. 28, 2019.
Chinese Search Report for Application No. 2019101884746.

* cited by examiner

METHOD FOR CONTROLLING A DRONE, DRONE AND SYSTEM

CROSS-REFERENCE TO RELATED APPLICATION

The present application is a U.S. National Stage entry under 35 U.S.C. § 371 based on International Application No. PCT/CN2019/100505, filed on Aug. 14, 2019, which claims priority to Chinese Patent Application No. 201910188474.6, filed on Mar. 13, 2019. The embodiment of the priority applications are hereby incorporated herein in their entirety by reference.

TECHNICAL FIELD

The present disclosure relates to the technical field of drones, and in particular, to a method for controlling a drone, a drone and a system.

BACKGROUND

A drone, also called an UAV, is an unmanned aerial vehicle operated by radio remote control equipment and its own program control device. With the development of drone technology, drones have been extensively used in plant protection, logistics, power inspection and other fields.

In the prior art, most drone landing platforms are fixed at a certain position. After the drone takes off from the position of the drone landing platform, if the drone needs to fly back, it must return to the take-off location to complete the landing. The moving platform can effectively improve the maneuverability in work of a multi-rotor drone and save working time. Since the moving platform is in motion, how to guide the multi-rotor drone to track and approach the moving platform, and how to guide the drone to accurately land on the platform during the landing process are problems that currently need to be solved.

SUMMARY

The present disclosure provides a method and device for controlling a drone, a drone and a system, which can solve or partially solve the above problems.

In an embodiment of the present disclosure, a method for controlling a drone is provided, which comprises:

determining operating parameters of a moving platform according to field-of-view images containing the moving platform collected at any two different moments and flight parameters of the drone;

calculating a time-varying tracking position of the moving platform based on the operating parameters;

controlling the drone to track the moving platform according to the time-varying tracking position of the moving platform; and controlling the drone to perform a landing operation according to a relative position of the moving platform and the drone during tracking.

In another embodiment of the present disclosure, a device for controlling a drone is provided, which comprises: a memory and a processor, wherein the memory is configured to store a program, the processor is coupled to the memory and is configured to execute the program stored in the memory for:

determining operating parameters of a moving platform according to field-of-view images containing the moving platform collected at any two different moments and flight parameters of the drone;

calculating a time-varying tracking position of the moving platform based on the operating parameters;

controlling the drone to track the moving platform according to the time-varying tracking position of the moving platform; and controlling the drone to perform a landing operation according to a relative position of the moving platform and the drone during tracking.

In yet another embodiment of the present disclosure, a drone is provided, which comprises:

an image collecting device for collecting field-of-view images;

a monitoring device for monitoring flight parameters of the drone; and a device for controlling a drone comprising a memory and a processor, wherein the memory is configured to store a program, the processor is coupled to the memory and is configured to execute the program stored in the memory for:

determining operating parameters of a moving platform according to field-of-view images containing the moving platform collected at any two different moments and flight parameters of the drone;

calculating a time-varying tracking position of the moving platform based on the operating parameters;

controlling the drone to track the moving platform according to the time-varying tracking position of the moving platform; and controlling the drone to perform a landing operation according to a relative position of the moving platform and the drone during tracking.

In still yet another embodiment of the present disclosure, a drone system is provided, which comprises a moving platform and the drone provided in the above embodiment.

The technical solutions according to the present disclosure determine the operating parameters of the moving platform according to the field-of-view images containing the moving platform collected at any two different moments and flight parameters of the drone, and calculate a time-varying tracking position of the moving platform based on the operating parameters. They do not rely on the field-of-view images collected in real time, and thus can effectively reduce the energy consumption caused by real-time image collection of the drone, and reduce the computational complexity of image recognition. They rely less on device performance and have high versatility. Moreover, the control operation frequency of the drone is usually higher than the visual recognition operation frequency. The technical solutions according to the present disclosure can effectively avoid many problems caused by the low frequency of the visual recognition operation, and facilitate improving the landing accuracy of the drone.

BRIEF DESCRIPTION OF DRAWINGS

In order to more clearly illustrate the technical solutions in the embodiments of the present disclosure or in the prior art, the drawings used in describing the embodiments or the prior art will be briefly described below. Obviously, the drawings in the following description are some embodiments of the present disclosure, and other drawings can be obtained according to the drawings without paying any creative effort for those skilled in the art.

DETAILED DESCRIPTION

In order to facilitate those skilled in the art to understand the technical solutions in the present disclosure, the technical solutions in the embodiments of the present disclosure will be clearly and completely described below with reference to the accompanying drawings in the embodiments of the present disclosure.

Some processes described in the description, claims, and accompanying drawings of the present disclosure include a plurality of operations occurring in a specific order, but these operations may not be performed in the order in which they are presented herein or executed in parallel. The serial numbers of the operation, such as 101, 102, etc., are only used to distinguish different operations, and the serial number itself does not represent any execution order. Additionally, these processes may include more or fewer operations, and these operations may be performed sequentially or in parallel. It should be noted that the descriptions of "first" and "second" herein are used to distinguish different messages, devices, components, etc., and do not represent the sequential order or define a different type.

In addition, the following embodiments are only some rather than all of the embodiments of the present disclosure. All other embodiments obtained by those skilled in the art based on the embodiments of the present disclosure without paying any creative effort shall be within the protection scope of the present disclosure.

Figure 1:
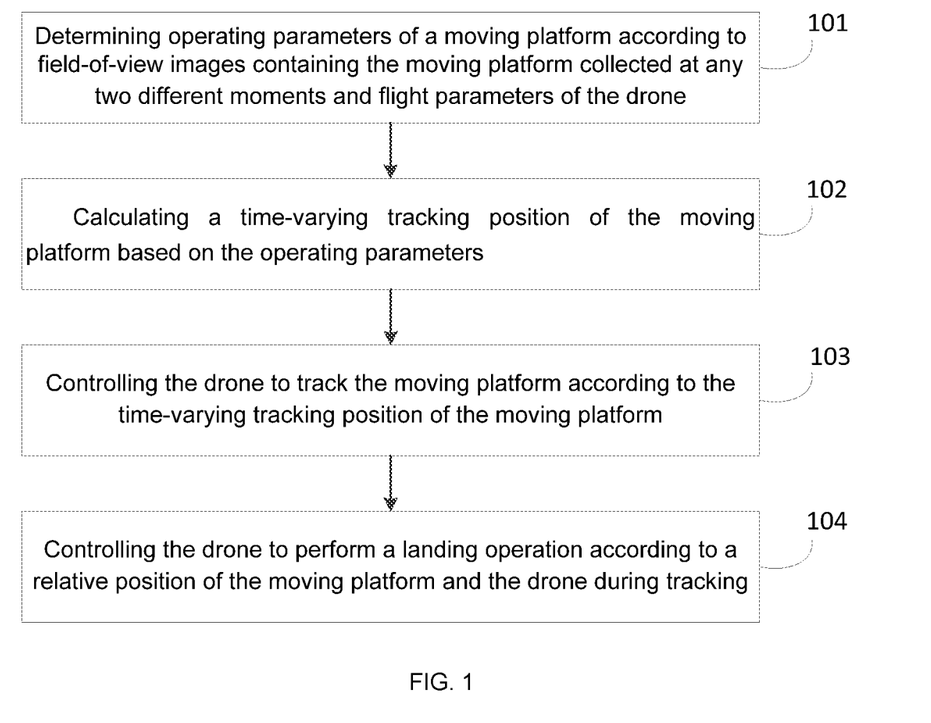
FIG. 1 is a schematic flowchart of a method for controlling a drone according to an embodiment of the present disclosure.

FIG. 1 is a schematic flow chart of a method for controlling a drone according to an embodiment of the present disclosure. As shown in FIG. 1, the method comprises:

Step 101: determining operating parameters of a moving platform according to field-of-view images containing the moving platform collected at any two different moments and flight parameters of the drone;

Step 102: calculating a time-varying tracking position of the moving platform based on the operating parameters;

Step 103: controlling the drone to track the moving platform according to the time-varying tracking position of the moving platform; and Step 104: controlling the drone to perform a landing operation according to a relative position of the moving platform and the drone during tracking.

Figure 2:
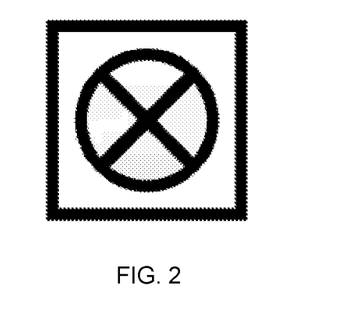
FIG. 2 is a schematic diagram of a positioning mark according to an embodiment of the present disclosure.

In the above Step 101, the field-of-view images may be collected by a camera (such as a monocular camera, a binocular camera, or an RGB-D camera) on the drone. The camera may collect field-of-view images after receiving a collection command. For example, after receiving a landing command, the drone adjusts the camera to a vertically downward state, pointing to the ground. At this point, the drone remains hovered, and the camera can collect ground images at any two different moments. The landing command may be triggered by the user through a remote control device (such as a remote controller, a smart phone, etc.), or automatically triggered when the battery is low, or triggered by the moving platform, etc., which is not specifically limited in the present embodiment. The purpose of collecting field-of-view images is to detect the position of the moving platform relative to the drone based on visual inspection techniques. Generally speaking, in order to increase the recognizability, the moving platform either has a specific shape structure or has a specific positioning mark (as shown in FIG. 2). For example, when a positioning mark is provided on the moving platform, the visual inspection module of the drone can determine the position of the moving platform relative to the drone by identifying the positioning mark in the field-of-view image and detecting the coordinates of the position of the center of the positioning mark in the image. It should be noted here that the ground image collected by the drone during hovering may not contain the moving platform, that is, the moving platform has not entered the field of view of the drone. At this point, the drone may further maintain the hovering state until the moving platform enters the field of view of the drone, and then the method according to the present embodiment restarts.

The flight parameters of the drone can be collected by various sensors (such as GPS, acceleration sensor, ranging sensor, etc.) on the drone. Specifically, the flight parameters may include, but are not limited to, a positioned position, a flight speed, a flight direction, a flight attitude, a flight height, and the like. Because the height of the moving platform is fixed, the vertical distance between the moving platform and the drone can be obtained according to the flight height of the drone.

The operating parameters of the moving platform may include, but are not limited to, a moving speed of the moving platform, and an actual position of the moving platform at a moment. For example, the any two different moments are respectively a first moment and a second moment, and the first moment is earlier than the second moment; the operating parameters may include: an actual position of the moving platform at the first moment, or an actual position of the moving platform at the second moment, or an actual position of an moving platform at any moment between the first moment and the second moment, or an actual position of the moving platform at any moment before the first moment, or an actual position of the moving platform at any moment after the second moment, and the like, which is not specifically limited in the present embodiment. It should be noted herein that the first moment, the second moment, any moment before the first moment, and any moment after the second moment should be within a preset calculation period. The calculation period may be manually set or automatically set by a control device of the drone, which is not specifically limited in the present embodiment.

When the operating parameters include the moving speed $V_T$ of the moving platform and the actual position $P_T$ of the moving platform at a moment $t_1$, in an implementable technical solution, the process of the above Step 102 may be characterized by the following expression:

$$P_T' = f_1(P_T, V_T, \Delta t_1)$$

where $P_T'$ is a time-varying tracking position of the moving platform, $V_T$ is the moving speed of the moving platform, $P_T$ is the actual position of the moving platform at a moment $t_1$, and $\Delta t_1$ is the time difference between the current moment $t_2$ and the moment $t_1$. $f_1(P_T, V_T, \Delta t_1)$ may be an empirical function and may be obtained from the prior art, which is not specifically limited in the present embodiment.

In a specific implementation example in which the moving platform is assumed to travel at a constant speed to perform dynamic position calculation, the above expression may be specifically characterized as:

$$P_T' = f_1(P_T, V_T, \Delta t_1) = P_T + V_T \Delta t_1$$

In the above Step 104, the relative position of the moving platform and the drone can be obtained by comparing in real time the tracking position of the moving platform and the positioned position recorded in the flight parameters of the drone at the same moment. The tracking position of the moving platform is calculated by the above steps. For example, the tracking position $P_T'$ of the moving platform at the current moment $t_2$ during tracking is calculated using the above steps, the positioned position $^U P_T$ of the drone recorded in the flight parameters at the current moment $t_2$ is acquired, and the relative position of the moving platform and the drone can be obtained by comparing the $P_T'$ and the $^U P_T$.

Alternatively, the relative position of the moving platform and the drone may be obtained based on a field-of-view image containing the moving platform collected during tracking and the flight parameters of the drone. For example, the relative position of the moving platform and the drone can be obtained by identifying the field-of-view image and calculating according to the identifying result and the flight parameters of the drone. It should be noted herein that, the process of "calculating the relative position of the moving platform and the drone based on a field-of-view image containing the moving platform collected during tracking and the flight parameters of the drone" will be elaborated later.

The technical solution according to the present embodiment determines the operating parameters of the moving platform according to the field-of-view images containing the moving platform collected at any two different moments and flight parameters of the drone, and calculates a time-varying tracking position of the moving platform based on the operating parameters. It does not rely on the field-of-view images collected in real time, and thus can effectively reduce the energy consumption caused by real-time image collection of the drone, and reduce the computational complexity of image identification. It relies less on device performance and has high versatility. Moreover, the control operation frequency of the drone is usually higher than the visual identification operation frequency. The technical solution according to the present embodiment can effectively avoid many problems caused by the low frequency of the visual identification operation, and helps to improve the landing accuracy of the drone.

In an implementable technical solution, the any two different moments are a first moment and a second moment, and the first moment is earlier than the second moment; "determining operating parameters of a moving platform according to field-of-view images containing the moving platform collected at any two different moments and flight parameters of the drone" in the above Step 101 may comprise the following steps:

Step 1011: calculating a first position of the moving platform relative to the drone at a first moment according to a first field-of-view image containing the moving platform collected at the first moment and a flight height recorded in first flight parameters of the drone at the first moment.

Step 1012: calculating a second position of the moving platform relative to the drone at a second moment according to a second field-of-view image containing the moving platform collected at the second moment and a flight height recorded in second flight parameters of the drone at the second moment.

Step 1023: determining a speed of the moving platform relative to the drone according to the first position, the second position, and a time difference between the first moment and the second moment.

In a specific implementation, the speed $^U V_T$ of the moving platform relative to the drone may be obtained by using the following calculation formula:

$$^U V_T = \frac{\Delta ^U P_T}{\Delta t_2} = \frac{^U P_{T2} - ^U P_{T1}}{t_{T2} - t_{T1}}$$

where $^U V_T$ is the speed of the moving platform relative to the drone, $^U P_{T2}$ is the second position, $^U P_{T1}$ is the first position, is a time difference between the first moment and the second moment, $t_{T2}$ is the second moment, and $t_{T1}$ is the first moment.

Step 1024: determining the moving speed of the moving platform according to the speed of the moving platform relative to the drone and a flight speed recorded in the second flight parameters.

Specifically, the moving speed of the moving platform may be obtained by using the following calculation formula:

$$V_T = V_U + ^U V_T$$

where $V_T$ is the moving speed of the moving platform, $V_U$ is the flight speed, and $^U V_T$ is the speed of the moving platform relative to the drone.

Step 1025: determining the actual position of the moving platform at the second moment according to the second position and a positioned position recorded in the second flight parameters.

Specifically, the actual position of the moving platform at the second moment can be obtained by using the following calculation formula:

$$P_T = P_U + ^U P_{T2}$$

where $P_T$ is the actual position of the moving platform at the second moment, $P_U$ is the positioned position, and $^U P_{T2}$ is the second position.

In an implementable technical solution, the moving platform is provided with a positioning mark a positioning mark used when the drone collects images. Correspondingly, in the above step 1011, "calculating a first position of the moving platform relative to the drone at a first moment according to a first field-of-view image containing the moving platform collected at the first moment and a flight height recorded in first flight parameters of the drone at the first moment" may be specifically implemented by the following steps:

Step S11: identifying the positioning mark in the first field-of-view image to obtain coordinates of a position of a center point of the positioning mark in the first field-of-view image; and Step S12: calculating the first position according to the coordinates of the position and a flight height recorded in the first flight parameters.

Specifically, the coordinates of the position include: an X-direction coordinate value α and a Y-direction coordinate value β on the horizontal plane. Correspondingly, the above step S12 may comprise:

Step S121: obtaining a vertical distance between the moving platform and the drone according to the flight height.

Step S122: calculating a preset conversion function with the vertical distance as an input parameter of the preset conversion function to obtain a conversion coefficient.

The above conversion function can be characterized by the following formula:

$$K = f_2(^U h_T)$$

where K is the conversion coefficient, $f_2(\ )$ is the conversion function, and $^U h_T$ is the vertical distance. Since the height of the moving platform is a fixed value, the vertical distance can be obtained by subtracting the height of the moving platform from the flight height of the drone. It should be noted that the specific implementation of the conversion function $f_2(\ )$ is not limited in the present embodiment, and the conversion function $f_2(\ )$ can be derived based on the prior art.

Step S123: determining a first coordinate of the moving platform relative to the drone in an X direction of the horizontal plane according to the X-direction coordinate value α and the conversion coefficient.

For example, the product of the X-direction coordinate value α and the conversion coefficient (i.e., the K calculated in the above step) is obtained as a first value, and is used as the first coordinate $X^T$ of the moving platform relative to the drone in the X direction of the horizontal plane. Specifically, it can be characterized by the following expression:

$$X_T = \alpha \cdot K = \alpha \cdot f_2(^U h_T)$$

Step S124: determining a second coordinate of the moving platform relative to the drone in a Y direction of the horizontal plane according to the Y-direction coordinate value β and the conversion coefficient.

For example, the product of the Y-direction coordinate value β and the conversion coefficient (i.e., the K calculated in the above step) is obtained as a second value, and is used as the second coordinate $Y_T$ of the moving platform relative to the drone in the Y direction of the horizontal plane. Specifically, it can be characterized by the following expression:

$$Y_T = \beta \cdot K = \beta \cdot f_2(^U h_T)$$

Step S125: obtaining the first position according to the first coordinate, the second coordinate, and the vertical distance.

Specifically, the first position can be characterized by the following expression:

$$^U P_{T^1} = (\alpha \cdot f_2(^U h_T) \beta \cdot f_2(^U h_T)^U h_T)^T$$

where $^U P_{T^1}$ is the first position.

It should be noted that the implementation process of the above step 1012 is the same as the above step 1011, and for details, please refer to the above.

When the vertical distance between the drone and the moving platform is relatively long, the positioning mark in the field of view of the camera is complete, and the positioning mark can be identified. When the vertical distance between the drone and the moving platform is relatively short, the positioning mark in the field of view of the camera may be not complete. With respect to such kind of situation, the present disclosure provides a positioning mark, the positioning mark comprises a central pattern and a geometric pattern surrounding the periphery of the central pattern, and the geometric pattern and the central pattern constitute a complete pattern. In the example of a positioning mark shown in FIG. 2, the complete pattern consists of a square in the periphery and a circle in the square, or consists of a square in the periphery, a circle in the square, and a cross pattern in the circle; the center pattern consists of a circle in the square, or consists of a cross pattern in the circle, or consists of the combination of a circle in the square and a cross pattern in the circle. Thus, when the vertical distance between the drone and the moving platform is relatively long, the relative position between the drone and the moving platform may be calculated using a complete pattern detection algorithm; when the vertical distance between the drone and the moving platform is relatively close, the relative position between the drone and the moving platform may be calculated using a central pattern detection algorithm. Using a complete pattern detection algorithm can be simply understood as identifying the complete pattern and determining the relative position between the moving platform and the drone based on the identified complete pattern. Using a central pattern detection algorithm can be simply understood as identifying the center pattern only and determining the relative position between the moving platform and the drone based on the identified center pattern. That is, the method according to the present embodiment may further include the following steps:

Step 105: acquiring third flight parameters of the drone during tracking.

Step 106: obtaining the relative position of the moving platform and the drone in the vertical direction according to a flight height recorded in the third flight parameters.

The relative position of the moving platform and the drone in the vertical direction is the vertical distance between the moving platform and the drone. Since the height of the moving platform is a fixed value, the vertical distance between the moving platform and the drone can be obtained based on the flight height recorded in the third flight parameters and the height of the moving platform.

Step 107: the relative position of the moving platform and the drone in the vertical direction is greater than or equal to a preset threshold, detecting a complete pattern in the field-of-view image collected during tracking using a complete pattern detection algorithm, and obtaining a relative position of the moving platform and the drone in the horizontal direction.

The specific implementing process of "detecting a complete pattern in the field-of-view image collected during tracking using a complete pattern detection algorithm, and obtaining a relative position of the moving platform and the drone in the horizontal direction" is similar to the Steps S11 and S12 above, namely, identifying a complete pattern in the field-of-view image collected during tracking, and obtaining coordinates of a position of the center point of the complete pattern in the field-of-view image collected during tracking; then calculating a relative position of the moving platform and the drone in the horizontal direction according to the coordinates of the position and a flight height recorded in the third flight parameters. For the specific implementation principle of the process, please refer to the corresponding content in the above, and the details will not be repeated herein.

Step 108: when the relative position of the moving platform and the drone in the vertical direction is less than the preset threshold, detecting a central pattern in the field-of-view image collected during tracking using a central pattern detection algorithm, and obtaining a relative position of the moving platform and the drone in the horizontal direction.

Similarly, the specific implementing process of "detecting a central pattern in the field-of-view image collected during tracking using a central pattern detection algorithm, and obtaining a relative position of the moving platform and the drone in the horizontal direction" is similar to the Steps S11 and S12 above, namely, identifying a central pattern in the field-of-view image collected during tracking, and obtaining coordinates of a position of the center point of the central pattern in the field-of-view image collected during tracking; then calculating a relative position of the moving platform and the drone in a horizontal direction according to the coordinates of the position and a flight height recorded in the third flight parameters. For the specific implementation principle of the process, please refer to the corresponding content in the above, and the details will not be repeated herein.

Further, in the present embodiment, the Step 104, i.e., "controlling the drone to perform a landing operation according to a relative position of the moving platform and the drone during tracking", may specifically comprise:

when a relative position of the moving platform and the drone in a vertical direction does not satisfy a predefined landing condition, and a relative position of the moving platform and the drone in a horizontal direction satisfies a predefined landing condition, controlling the drone to reduce its flight height;

when neither a relative position of the moving platform and the drone in a vertical direction nor a relative position of the moving platform and the drone in a horizontal direction satisfies a predefined landing condition, controlling the drone to maintain its flight height unchanged and continuing to track the moving platform;

when both a relative position of the moving platform and the drone in a vertical direction and a relative position of the moving platform and the drone in a horizontal direction satisfy a predefined landing condition, controlling the drone to turn off a motor and complete the landing operation; and when a relative position of the moving platform and the drone in a vertical direction satisfies a predefined landing condition, and a relative position of the moving platform and the drone in a horizontal direction does not satisfy a predefined landing condition, controlling the drone to raise its flight height to a preset height and restarting an autonomous landing process.

The predefined landing condition may include: a first predefined condition with respect to the relative position of the moving platform and the drone in the vertical direction, and a second predefined condition with respect to the relative position of the moving platform and the drone in the horizontal direction. The first and second predefined conditions may be determined based on experience or based on historical control parameters, which is not specifically limited in the present embodiment.

Since the moving platform is moving and is easily out of the field of view of the camera, the technical solution according to the present embodiment estimates the time-varying tracking position of the moving platform according to field-of-view images collected at any two different moments and flight parameters of the drone, and then controls the drone to track the moving platform according to the estimated tracking position. In addition, the technical solution according to the present embodiment improves the positioning mark on the moving platform, so that when the drone is too close to the moving platform to collect the complete pattern, only the central pattern in the positioning mark is identified, thereby realizing the landing control of the drone when the drone is a short distance away from the moving platform, and facilitating improving the accuracy of the landing. In addition, the technical solution according to the present embodiment relies less on the performance of the drone and has high versatility. Since it only needs field-of-view images collected at any two different moments and flight parameters of the drone to calculate the time-varying tracking position of the moving platform, the calculating amount in image recognition is small.

Figure 3:
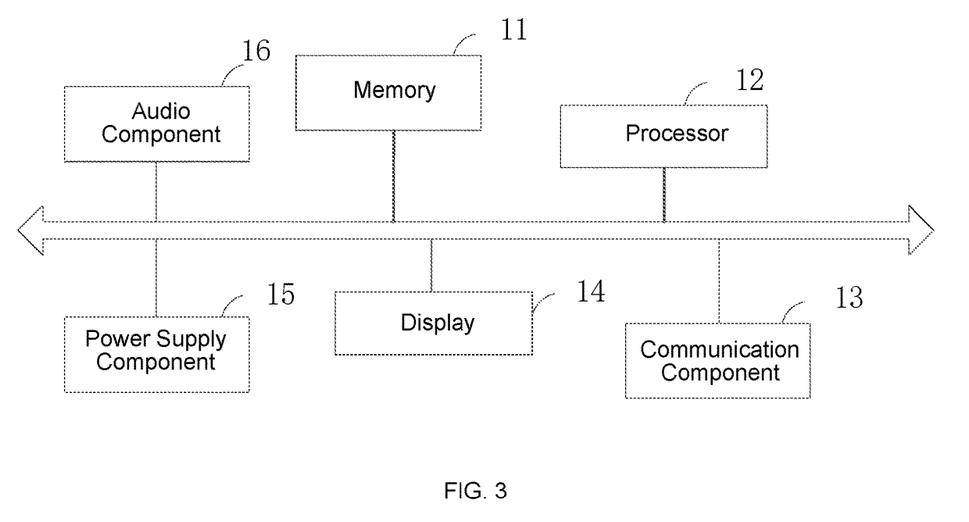
FIG. 3 is a schematic structural diagram of a device for controlling a drone according to an embodiment of the present disclosure.

FIG. 3 is a schematic structural diagram of a device for controlling a drone according to an embodiment of the present disclosure. As shown in FIG. 3, the device for controlling a drone includes a memory 11 and a processor 12. The memory 11 may be configured to store other various data to support operations on the device for controlling a drone. Examples of such data include instructions for any application or method operating on the device for controlling a drone. The memory 11 can be implemented by any type of volatile or non-volatile storage device or a combination thereof, such as a static random access memory (SRAM), an electrically erasable programmable read only memory (EEPROM), an erasable programmable read only memory (EPROM), a programmable read only memory (PROM), a read only memory (ROM), a magnetic memory, a flash memory, a magnetic disk or an optical disk.

The processor 12 is coupled to the memory 11 and is configured to execute the program stored in the memory 11 for:

determining operating parameters of a moving platform according to field-of-view images containing the moving platform collected at any two different moments and flight parameters of the drone;

calculating a time-varying tracking position of the moving platform based on the operating parameters;

controlling the drone to track the moving platform according to the time-varying tracking position of the moving platform; and controlling the drone to perform a landing operation according to a relative position of the moving platform and the drone during tracking.

Further, the any two different moments are a first moment and a second moment, and the first moment is earlier than the second moment; the processor executes the program stored in the memory to implement the following process:

calculating a first position of the moving platform relative to the drone at the first moment according to a first field-of-view image containing the moving platform collected at the first moment and a flight height recorded in first flight parameters of the drone at the first moment;

calculating a second position of the moving platform relative to the drone at the second moment according to a second field-of-view image containing the moving platform collected at the second moment and a flight height recorded in second flight parameters of the drone at the second moment;

determining the speed of the moving platform relative to the drone according to the first position, the second position, and a time difference between the first moment and the second moment;

determining the moving speed of the moving platform according to the speed of the moving platform relative to the drone and a flight speed recorded in the second flight parameters; and determining the actual position of the moving platform at the second moment according to the second position and a positioned position recorded in the second flight parameters.

Further, the moving platform is provided with a positioning mark used when the drone collects images. The positioning mark comprises a central pattern and a geometric pattern surrounding the periphery of the central pattern, and the geometric pattern and the central pattern constitute a complete pattern; and the processor executes the program stored in the memory to implement the following process:

acquiring third flight parameters of the drone during tracking;

obtaining a relative position of the moving platform and the drone in the vertical direction according to a flight height recorded in the third flight parameters;

when the relative position of the moving platform and the drone in the vertical direction is greater than or equal to a preset threshold, detecting a complete pattern in the fieldof-view image collected during tracking using a complete pattern detection algorithm, and obtaining a relative position of the moving platform and the drone in the horizontal direction; and when the relative position of the moving platform and the drone in the vertical direction is less than the preset threshold, detecting a central pattern in the field-of-view image collected during tracking using a central pattern detection algorithm, and obtaining a relative position of the moving platform and the drone in the horizontal direction.

Further, the processor executes the program stored in the memory to implement the following process:

when a relative position of the moving platform and the drone in a vertical direction does not satisfy a predefined landing condition, and a relative position of the moving platform and the drone in a horizontal direction satisfies a predefined landing condition, controlling the drone to reduce its flight height;

when neither a relative position of the moving platform and the drone in a vertical direction nor a relative position of the moving platform and the drone in a horizontal direction satisfies a predefined landing condition, controlling the drone to maintain its flight height unchanged and continuing to track the moving platform;

when both a relative position of the moving platform and the drone in a vertical direction and a relative position of the moving platform and the drone in a horizontal direction satisfy a predefined landing condition, controlling the drone to turn off a motor and complete the landing operation; and when a relative position of the moving platform and the drone in a vertical direction satisfies a predefined landing condition, and a relative position of the moving platform and the drone in a horizontal direction does not satisfy a predefined landing condition, controlling the drone to raise its flight height to a preset height and restarting an autonomous landing process.

The technical solution according to the present embodiment determines the operating parameters of the moving platform according to the field-of-view images containing the moving platform collected at any two different moments and flight parameters of the drone, and calculates a time-varying tracking position of the moving platform based on the operating parameters. It does not rely on the field-of-view images collected in real time, and thus can effectively reduce the energy consumption caused by real-time image collection of the drone, and reduce the computational complexity of image identification. It relies less on device performance and has high versatility. Moreover, the control operation frequency of the drone is usually higher than the visual identification operation frequency. The technical solution according to the present embodiment can effectively avoid many problems caused by the low frequency of the visual identification operation, and facilitate improving the landing accuracy of the drone.

The processor 12 can implement other functions in addition to the above functions when executing the program in the memory 11. For details, please refer to the description of the above embodiments.

Further, as shown in FIG. 3, the device for controlling a drone further comprises: a display 14, a communication component 13, a power supply component 15, an audio component 16, and the like. Only some of the components are schematically illustrated in FIG. 3, and it does not mean that the computing device comprises the components shown in FIG. 3 only.

Correspondingly, the present disclosure further provides a computer readable storage medium storing a computer program, and when executed by a computer, the computer program can implement the steps or functions of the methods for controlling a drone according to the above embodiments.

Figure 4:
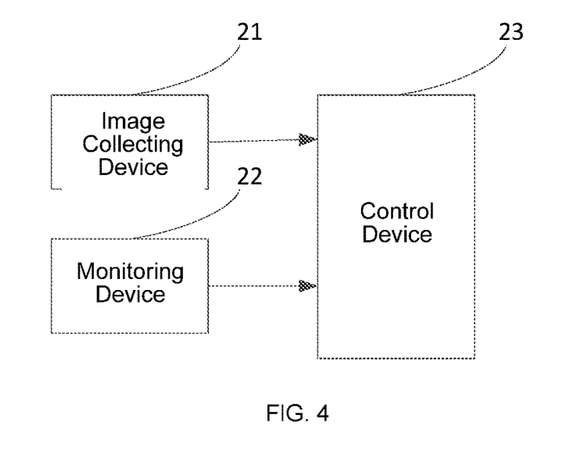
FIG. 4 is a schematic diagram of the principle of a drone according to an embodiment of the present disclosure.

FIG. 4 is a schematic structural diagram of a drone according to an embodiment of the present disclosure. As shown in FIG. 4, the drone comprises an image collecting device 21, a monitoring device 22, and a control device 23. The image collecting device 21 is configured to collect field-of-view images. The image collecting device 21 may include, but is not limited to, a monocular camera, a binocular camera, or an RGB-D camera and the like. The monitoring device 22 is configured to monitor the flight parameters of the drone. The flight parameters may include: a flight height (or a vertical distance from the moving platform), a flight speed, a flight attitude, a positioned position, and the like, which are not specifically limited in the present embodiment. Monitoring device 22 may include, but is not limited to, an acceleration sensor, a GPS, a ranging sensor, and the like. The control device 23 can be directly implemented by using the device for controlling a drone provided in the above embodiment. For the specific implementation, please refer to the corresponding contents in the above, and the details will not be repeated herein.

The technical solution according to the present embodiment determines the operating parameters of the moving platform according to the field-of-view images containing the moving platform collected at any two different moments and flight parameters of the drone, and calculates a time-varying tracking position of the moving platform based on the operating parameters. It does not rely on the field-of-view images collected in real time, and thus can effectively reduce the energy consumption Zo caused by real-time image collection of the drone, and reduce the computational complexity of image identification. It relies less on device performance and has high versatility. Moreover, the control operation frequency of the drone is usually higher than the visual identification operation frequency. The technical solution according to the present embodiment can effectively avoid many problems caused by the low frequency of the visual identification operation, and facilitate improving the landing accuracy of the drone.

Yet another embodiment of the present disclosure provides a drone system. The drone system comprises the drone shown in FIG. 4 and a moving platform. The moving platform is used to park drones, and can also provide charging services for drones. In a specific implementation, the moving platform is provided with a positioning mark used when the drone collects images, the positioning mark comprises a central pattern and a geometric pattern surrounding the periphery of the central pattern, and the geometric pattern and the central pattern constitute a complete pattern. As shown in FIG. 2, the complete pattern consists of a square in the periphery and a circle in the square, or consists of a square in the periphery, a circle in the square, and a cross pattern in the circle; the center pattern consists of a cross pattern.

By providing the positioning mark of the above structure on the moving platform, when the drone is too close to the moving platform to collect the complete pattern, only the central pattern in the positioning mark is identified, thereby realizing the landing control of the drone when the drone is a short distance away from the moving platform, and facilitating improving the accuracy of the landing.

The device embodiments described above are merely illustrative. The units described above as separate components may be, or may not be, physically separated. The component shown as a unit may be, or may not be, a physical unit; they may be located in one place, or may be situated on a plurality of network units. It is possible to select part or all of the units according to actual needs to achieve the aim of the solution of the embodiments. Those of ordinary skill in the art can understand and implement them without paying any creative effort.

Through the description of the above embodiments, those skilled in the art can clearly understand that the embodiments can be implemented by adding a necessary general hardware platform, and can also be implemented by a combination of hardware and software. Based on such an understanding, the substance or the part that contributes to the prior art of the above technical solutions may be reflected in the form of a computer product. The present disclosure may take the form of a computer program product embodied on one or more computer-usable storage media (including but not limited to magnetic storage media, CD-ROMs, optical storage media, etc.) having computer-usable program codes recorded thereon.

What is claimed is:

1. A method for controlling a drone, comprising:
   determining operating parameters of a moving platform according to field-of-view images containing the moving platform, and flight parameters of the drone, collected at any two different moments;
   calculating a time-varying tracking position of the moving platform based on the operating parameters;
   controlling the drone to track the moving platform according to the time-varying tracking position of the moving platform; and
   controlling the drone to perform a landing operation according to a relative position of the moving platform and the drone during tracking,
   wherein the any two different moments are only a first moment and a second moment, and the first moment is earlier than the second moment,
   the moving platform is provided with a positioning mark used when the drone collects images, and
   the positioning mark comprises a central pattern and a geometric pattern surrounding a periphery of the central pattern, and the geometric pattern and the central pattern constitute a complete pattern; and
   wherein the method further comprises:
   acquiring third flight parameters of the drone during tracking;
   obtaining a relative position of the moving platform and the drone in a vertical direction according to a flight height recorded in the third flight parameters;
   when the relative position of the moving platform and the drone in the vertical direction is greater than or equal to a preset threshold, detecting a complete pattern in the field-of-view image collected during tracking using a complete pattern detection algorithm, and obtaining a relative position of the moving platform and the drone in a horizontal direction; and
   when the relative position of the moving platform and the drone in the vertical direction is less than the preset threshold, detecting a central pattern in the field-of-view image collected during tracking using a central pattern detection algorithm, and obtaining a relative position of the moving platform and the drone in a horizontal direction.

2. The method according to claim 1, wherein the operating parameters include a moving speed of the moving platform and an actual position of the moving platform at a moment.

3. The method according to claim 1, wherein the flight parameters include: one or more of a positioned position, a flight speed, a flight direction, a flight attitude and a flight height.

4. The method according to claim 1, wherein
   determining operating parameters of a moving platform according to field-of-view images containing the moving platform, and flight parameters of the drone, collected at any two different moments, comprises:
   calculating a first position of the moving platform relative to the drone at a first moment according to a first field-of-view image containing the moving platform collected at the first moment and a flight height recorded in first flight parameters of the drone at the first moment;
   calculating a second position of the moving platform relative to the drone at a second moment according to a second field-of-view image containing the moving platform collected at the second moment and a flight height recorded in second flight parameters of the drone at the second moment;
   determining a speed of the moving platform relative to the drone according to the first position, the second position, and a time difference between the first moment and the second moment;
   determining the moving speed of the moving platform according to the speed of the moving platform relative to the drone and a flight speed recorded in the second flight parameters; and
   determining an actual position of the moving platform at the second moment according to the second position and a positioned position recorded in the second flight parameters.

5. The method according to claim 4, wherein the moving platform is provided with a positioning mark used when the drone collects images; and
   calculating a first position of the moving platform relative to the drone at a first moment according to a first field-of-view image containing the moving platform collected at the first moment and a flight height recorded in first flight parameters of the drone at the first moment comprises:
   identifying the positioning mark in the first field-of-view image to obtain coordinates of a position of a center point of the positioning mark in the first field-of-view image; and
   calculating the first position according to the coordinates of the position and a flight height recorded in the first flight parameters.

6. The method according to claim 5, wherein the coordinates of the position include an X-direction coordinate value $\alpha$ and a Y-direction coordinate value $\beta$ on a horizontal plane; and
   calculating the first position according to the coordinates of the position and a flight height recorded in the first flight parameters comprises:
   obtaining a vertical distance between the moving platform and the drone according to the flight height;
   calculating a preset conversion function with the vertical distance as an input parameter of the preset conversion function to obtain a conversion coefficient;
   determining a first coordinate of the moving platform relative to the drone in an X direction of the horizontal plane according to the X-direction coordinate value $\alpha$ and the conversion coefficient;

determining a second coordinate of the moving platform relative to the drone in a Y direction of the horizontal plane according to the Y-direction coordinate value β and the conversion coefficient; and obtaining the first position according to the first coordinate, the second coordinate, and the vertical distance.

7. The method according to claim 4, wherein a speed of the moving platform relative to the drone $^U T_T$ is obtained using the following calculating formula:

$$^U V_T = \frac{\Delta^U P_T}{\Delta t_2} = \frac{^U P_{T2} - ^U P_{T1}}{t_{T2} - t_{T1}}$$

where $^U T_V$ is the speed of the moving platform relative to the drone, $^U P_{T^2}$ is the second position, $^U P_{T^1}$ is the first position, $\Delta t_2$ is a time difference between the first moment and the second moment, $t_{T^2}$ is the second moment, and $t_{T^1}$ is the first moment.

8. The method according to claim 1, wherein controlling the drone to perform a landing operation according to a relative position of the moving platform and the drone during tracking comprises:

when a relative position of the moving platform and the drone in a vertical direction does not satisfy a predefined landing condition, and a relative position of the moving platform and the drone in a horizontal direction satisfies a predefined landing condition, controlling the drone to reduce its flight height;

when neither a relative position of the moving platform and the drone in a vertical direction nor a relative position of the moving platform and the drone in a horizontal direction satisfies a predefined landing condition, controlling the drone to maintain its flight height unchanged and continuing to track the moving platform;

when both a relative position of the moving platform and the drone in a vertical direction and a relative position of the moving platform and the drone in a horizontal direction satisfy a predefined landing condition, controlling the drone to turn off a motor and complete the landing operation; and when a relative position of the moving platform and the drone in a vertical direction satisfies a predefined landing condition, and a relative position of the moving platform and the drone in a horizontal direction does not satisfy a predefined landing condition, controlling the drone to raise its flight height to a preset height and restarting an autonomous landing process.

9. The method according to claim 4, wherein:
the moving speed of the moving platform is obtained using the following calculating formula:

$$V_T = V_U + ^U V_T$$

where $V_T$ is the moving speed of the moving platform, $V_U$ is a flight speed, and $^U T_V$ is the speed of the moving platform relative to the drone.

10. The method according to claim 1, further comprising:
obtaining a relative position of the moving platform and the drone by at least one of:

providing a positioning mark on the moving platform, identifying a positioning mark in the field-of-view image at a moment, and detecting coordinates of a position of a center of the positioning mark in the image to determine the relative position of the moving platform and the drone at this moment;

obtaining the relative position of the moving platform and the drone by comparing the tracking position of the moving platform and a positioned position recorded in the flight parameters of the drone at a same moment; or obtaining the relative position of the moving platform and the drone based on a field-of-view image containing the moving platform collected during tracking and the flight parameters of the drone.

11. A drone, comprising:
an image collecting device for collecting field-of-view images;
a monitoring device for monitoring flight parameters of the drone; and
a device for controlling a drone comprising a memory and a processor, wherein the memory is configured to store a program, the processor is coupled to the memory and is configured to execute the program stored in the memory to implement a method for controlling a drone comprising:

determining operating parameters of a moving platform according to field-of-view images containing the moving platform, and flight parameters of the drone, collected at any two different moments;

calculating a time-varying tracking position of the moving platform based on the operating parameters;

controlling the drone to track the moving platform according to the time-varying tracking position of the moving platform; and controlling the drone to perform a landing operation according to a relative position of the moving platform and the drone during tracking, the any two different moments are only a first moment and a second moment, and the first moment is earlier than the second moment;

the moving platform is provided with a positioning mark used when the drone collects images; and the positioning mark comprises a central pattern and a geometric pattern surrounding a periphery of the central pattern, and the geometric pattern and the central pattern constitute a complete pattern; and the processor executes the program stored in the memory to implement the following process:

acquiring third flight parameters of the drone during tracking;

obtaining a relative position of the moving platform and the drone in a vertical direction according to a flight height recorded in the third flight parameters;

when a relative position of the moving platform and the drone in the vertical direction is greater than or equal to a preset threshold, detecting a complete pattern in the field-of-view image collected during tracking using a complete pattern detection algorithm, and obtaining a relative position of the moving platform and the drone in a horizontal direction; and when the relative position of the moving platform and the drone in the vertical direction is less than the preset threshold, detecting a central pattern in the field-of-view image collected during tracking using a central pattern detection algorithm, and obtaining a relative position of the moving platform and the drone in a horizontal direction.

12. The drone according to claim 11, wherein the processor executes the program stored in the memory to implement the following process:

calculating a first position of the moving platform relative to the drone at a first moment according to a first field-of-view image containing the moving platform collected at the first moment and a flight height recorded in first flight parameters of the drone at the first moment;

calculating a second position of the moving platform relative to the drone at a second moment according to a second field-of-view image containing the moving platform collected at the second moment and a flight height recorded in second flight parameters of the drone at the second moment;

determining a speed of the moving platform relative to the drone according to the first position, the second position, and a time difference between the first moment and the second moment;

determining the moving speed of the moving platform according to the speed of the moving platform relative to the drone and a flight speed recorded in the second flight parameters; and determining an actual position of the moving platform at the second moment according to the second position and a positioned position recorded in the second flight parameters.

13. The drone according to claim 11, wherein the processor executes the program stored in the memory to implement the following process:

when a relative position of the moving platform and the drone in a vertical direction does not satisfy a predefined landing condition, and a relative position of the moving platform and the drone in a horizontal direction satisfies a predefined landing condition, controlling the drone to reduce its flight height;

when neither a relative position of the moving platform and the drone in a vertical direction nor a relative position of the moving platform and the drone in a horizontal direction satisfies a predefined landing condition, controlling the drone to maintain its flight height unchanged and continuing to track the moving platform;

when both a relative position of the moving platform and the drone in a vertical direction and a relative position of the moving platform and the drone in a horizontal direction satisfy a predefined landing condition, controlling the drone to turn off a motor and complete the landing operation; and when a relative position of the moving platform and the drone in a vertical direction satisfies a predefined landing condition, and a relative position of the moving platform and the drone in a horizontal direction does not satisfy a predefined landing condition, controlling the drone to raise its flight height to a preset height and restarting an autonomous landing process.

14. A drone system, comprising: a moving platform and the drone according to claim 11.

15. The drone system according to claim 14, wherein the moving platform is provided with a positioning mark used when the drone collects images, the positioning mark comprises a central pattern and a geometric pattern surrounding a periphery of the central pattern, and the geometric pattern and the central pattern constitute a complete pattern.

* * * * *